United States Patent [19]

Moser

[11] Patent Number: 4,700,812
[45] Date of Patent: Oct. 20, 1987

[54] VEHICULAR SUSPENSION SYSTEM

[75] Inventor: Bernd Moser, Hamm/Sieg, Fed. Rep. of Germany

[73] Assignee: Boge GmbH, Eitorf, Fed. Rep. of Germany

[21] Appl. No.: 864,452

[22] Filed: May 16, 1986

[30] Foreign Application Priority Data

May 22, 1985 [DE] Fed. Rep. of Germany ....... 3518382

[51] Int. Cl.$^4$ .............................................. F16D 66/00
[52] U.S. Cl. ..................................... 188/1.11; 73/653; 280/707
[58] Field of Search ....................... 188/1.11; 280/707; 73/11, 653, 655

[56] References Cited

U.S. PATENT DOCUMENTS

| Re. 31,416 | 10/1983 | Olsen et al. ...................... 73/862.59 |
| 3,172,630 | 3/1965 | Goodman ...................... 188/1.11 X |
| 3,731,542 | 5/1973 | Forsberg ........................... 73/516 R |
| 3,833,094 | 9/1924 | Grossman .......................... 188/1.11 |
| 3,960,009 | 6/1976 | Roepke et al. ........................... 73/88 |
| 4,065,154 | 12/1977 | Glaze ................................... 280/707 |
| 4,104,921 | 8/1978 | Nissl ..................................... 73/517 |
| 4,111,033 | 9/1978 | Bolliger .................................. 73/11 |
| 4,118,977 | 10/1978 | Olsen et al. ............................ 73/141 |
| 4,471,451 | 9/1984 | Schenck .............................. 364/605 |
| 4,477,732 | 10/1984 | Mausner .................................. 307/9 |
| 4,483,546 | 11/1984 | Brearley .................................. 280/6 |
| 4,546,960 | 10/1985 | Abrams et al. ................. 280/707 X |
| 4,558,430 | 12/1985 | Mogami et al. ..................... 364/900 |
| 4,563,734 | 1/1986 | Mori et al. .......................... 364/157 |

FOREIGN PATENT DOCUMENTS

| 2624884 | 8/1980 | Fed. Rep. of Germany . |
| 3212433 | 4/1983 | Fed. Rep. of Germany . |
| 2532433 | 6/1983 | France . |

*Primary Examiner*—George E. A. Halvosa
*Attorney, Agent, or Firm*—Nils H. Ljungman

[57] ABSTRACT

Vehicular suspension system with apparatus for the measurement of at least one parameter related to suspended and/or nonsuspended vehicle parts. The apparatus has sensing units integrated into a vibration damper. The measurement is thereby made by a light source located inside an inertial mass, the light from which travels through at least one hole in the mass and strikes one or more photo elements located in the inside wall of a housing. This apparatus makes possible a direct evaluation of the signals. If necessary, digital words can be formed by different photo elements and holes for the determination of the position.

19 Claims, 8 Drawing Figures

VEHICULAR SUSPENSION SYSTEM

CROSS REFERENCE TO CO-PENDING APPLICATION

Co-pending Application Ser. No. 864,447, filed on May 16, 1986, entitled "Accelerometer", is assigned to the same assignee as the instant application.

BACKGROUND OF THE INVENTION

1. Field of the Invention

The invention relates to vehicular suspension system with an apparatus for the measurement of the acceleration of suspended and/or non-suspended vehicle parts or the relative acceleration between suspended and non-suspended vehicle parts with integrated acceleration sensors disposed in hydraulic, pneumatic or hydropneumatic aggregates such as vibration absorbers, pneumatic springs and hydropneumatic suspensions.

2. Description of the Prior Art

Suspension systems are known from, for example, U.S. Pat. No. 4,483,546, entitled "Self-Levelling Suspension", which corresponds to German Laid Open Patent Appln. No. DE-OS 32 12 433, in which each suspension unit of a vehicle has a sensor to adjust its platform height. The sensor produces an output value which changes progressively with the platform height. The sensor is thereby used to adjust the platform height, that is, the distance between the suspended and non-suspended vehicle parts. These sensors are used to determine the distance a piston is to travel.

The prior art also includes pure accelerometers, such as in German Patent No. DE-PS 26 24 884, in which, for the measurement of the force, two opposite reflecting surfaces form a gap, whose enclosed angle can be modified by a force acting on the inert mass. As a result of a change in the gap angle, the number of reflections changes, as well as the angle of reflection, measured toward the reflecting surface, of a beam of light emitted from the light source at a determined angle, and thus the intensity of the light which falls into the light inlet opening. Such a measurement is difficult and expensive, and cannot be used without further modification on all parts of the vehicle, since it is susceptible to interference and quite sensitive.

Another example of the prior art is U.S. Pat. No. 4,477,732, entitled "Sensor For Acceleration", which has a first photoconductor disposed in a suspended body. This first photoconductor leads light into the body from an outside light source. The light is then conducted to each of three additional photoconductors when each is aligned with the first photoconductor as the body moves within a housing. At the end of each of the three additional photoconductors there is connected a photo element which converts the light falling thereon to an electrical signal which is connected into an acceleration-related signal.

All of the afore-mentioned patents are incorporated herein by reference as if fully set forth herein in their entirety.

OBJECTS OF THE INVENTION

An object of the invention is the creation of an apparatus for the measurement of the acceleration of suspended and/or non-suspended vehicle parts, or relative acceleration between suspended and non-suspended vehicle parts.

A further object of the invention is the creation of a measurement apparatus which is mechanically sturdy and not susceptible to interference.

A yet further object of the invention is the creation of a measurement apparatus which is also suitable for integration in a vibration damper, to guarantee optimal measurement capabilities, secure installation and a minimum required space.

A still further object of the invention is the creation of a measurement apparatus which is a very cost-effective transducer system.

SUMMARY OF THE INVENTION

The invention achieves these objectives in that there is at least one suspended inert mass in a cavity in the piston rod and/or in a cavity on the cylinder, whereby the mass has, inside, at least one light source, the light from which travels through at least one hole in the mass and strikes at least on photo element located on the inner wall of a housing.

Such an accelerometer is mechanically sturdy and, as a result of the use of the digital principle, possible sources of interference are kept to a minimum.

According to another important characteristic, corresponding to a hole, there are several photo elements arranged in the direction of motion at a distance from one another.

The light source is routed through a single hole, so that when the beam of light strikes the corresponding photo element, a digital signal is produced by means of an encoder electronic system, corresponding to the acceleration responsible for the excursion in question.

One particularly advantageous embodiment provides that when several photo elements are used, arranged on a reference circle, there are several groups of several holes at some distance from one another and approximately at right angles to the photo elements, whereby the groups of holes are arranged in straight lines running parallel to one another. In such an embodiment, a digital word is produced, for example, by an electronic counter stage.

In one configuration of the invention, there is a photo element for each group of holes, and by an appropriate arrangement of the holes in each group, a direct digital resolution of the signals is possible. By means of an appropriate arrangement of the hole of a group at intervals and a photo element which corresponds to each group, a variable digital word can be formed, corresponding to the number of groups of holes.

As a function of the number of groups of holes, a digital word can be formed with a corresponding number of digits. Such digital words can be processed directly in a subsequent electronic system, so that interference from outside sources and the time and effort required for evaluation can be reduced to a minimum.

In one configuration of the invention, the mass exhibits a spring on each end in the direction of motion, which serves as the power feed for the light source.

An important characteristic of the invention is that the mass, on each end in the direction of motion, exhibits an electrically-conducting and mechanically flexible substance, by means of which power is fed to the light source.

BRIEF DESCRIPTION OF THE DRAWINGS

The above, as well as other features and advantages of the present invention, can be more readily appreciated through consideration of the detailed description of preferred embodiments in conjunction with the drawings, in which.

DESCRIPTION OF THE PREFERRED EMBODIMENTS

Figure 1:
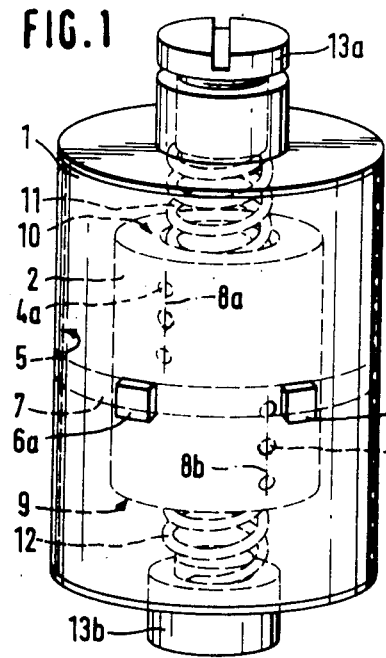
FIG. 1 shows schematically an accelerometer in cross section with two groups of holes and two photo elements.

The accelerometer illustrated in FIG. 1 comprises essentially a preferably cylindrical housing 1 and a cylindrical inertial mass 2 fastened to springs 11 and 12, which housing 1 is moved out of position under the influence of an external force. When an external force moves the housing 1, the inertial mass 2 is restrained by its inertia and then moves to a neutral position by action of the springs 11 and 12. The inertial mass 2 may move in either direction within the housing 1. The inertial mass 2 is provided with a group of holes 4a and another group of holes 4b. Three holes are shown in each group of holes 4a and 4b, for convenience, but any number of holes could be used for increased resolution. There is a light source 3 corresponding to the holes 4a and 4b. In the housing 1, there are photo elements 6a and 6b opposite each group of holes 4a and 4b. The housing 1 has an inner wall 5 into which the inertial mass 2 fits and moves within. A reference circle 7 represents a neutral position in the middle of the housing 1 along which the photo elements 6a and 6b are mounted. A number of orifices 8a are aligned with and move past the photo element 6a, thereby illuminating the photo element 6a as the inertial mass 2 moves within the housing 1. A second number of orifices 8b are aligned with and move past the photo element 6b, thereby illuminating the photo element 6b as the inertial mass 2 moves within the housing 1.

Within two ends 9 and 10 of the inertial mass 2, springs 12 and 11, respectively, are inserted in holes in the ends 9 and 10. The springs 11 and 12 preferably conduct electricity and provide the light source 3 with electricity for the lighting thereof. The ends of the springs 11 and 12, which are opposite the inertial mass 2, are held in terminal assemblies with spring adjustments 13a and 13b. Electrical connectors can also be connected to the spring adjustments 13a and 13b in order to provide electricity for the light source. Alternatively, other connections can be made to the light source 3 by the use of flexible wires, as are well known in the prior art. Some examples of wire are found in U.S. Pat. No. 3,960,009; Reissue U.S. Pat. No. 31,416; and U.S. Pat. No. 4,118,977, all of which are incorporated herein by reference as if set forth herein in their entirety.

The spring adjustments 13a and 13b can adjust the springs 11 and 12 to determine a fundamental frequency of the combination of the springs 11 and 12 and the inertial mass 2, such that the fundamental frequency can be adjusted to be within a specified range.

The size, thickness, length, and shape of the springs 11 and 12 are chosen for appropriate movement of the inertial mass 2 within the housing 1.

The evaluation is done via an electronic counter stage (shown in FIG. 7) which produces a digital word, which can be processed directly.

Figure 2:
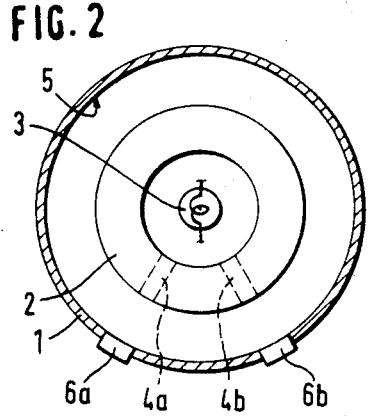
FIG. 2 shows schematically a cross section of the accelerometer illustrated in FIG. 1.

The overhead view shown in FIG. 2 shows the inertial mass 2, which is suspended in the housing 1, and whereby the light from the light source 3 reaches the photo elements 6a and 6b via the holes 4a and 4b. The light source 3 is preferably a low voltage, heavy filament light compatible with 12 volt operation, such as an elongated filament, cylindrical light bulb found in automobiles, but may be any appropriate light bulb. The outside surface of the inertial mass 2 facing the inner wall 5 of the housing 1 is disposed a given distance in the order of somewhat less than a millimeter to a few millimeters in order to assure that the inertial mass 2, if vibrationally excited radially, will not collide with the inner wall 5 and distort readings of the photo elements and will not have at least the kinetic energy of the cylindrical inertial mass 2 dissipated by collisions as the inertial mass 2 moves back and forth longitudinally.

Figure 3:
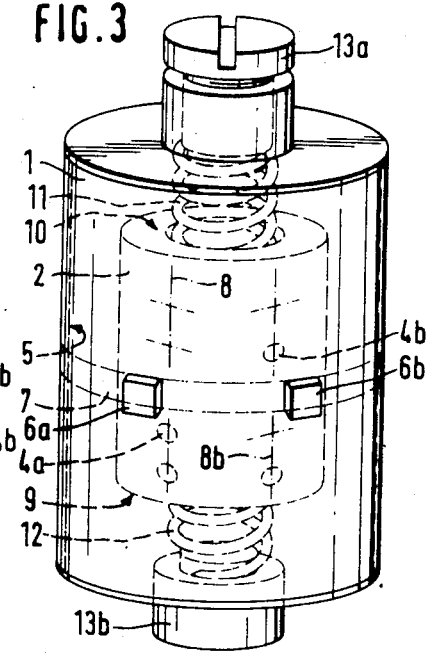
FIG. 3 shows schematically another embodiment of an accelerometer with two groups of holes and two photo elements for the direct formation of a digital word.

FIG. 3 shows another embodiment of an accelerometer, whereby the inertial mass 2 again exhibits two groups of holes 4a and 4b, which are arranged one behind the other in the direction of movement. Thereby, when the inertial mass 2 has a cylindrical shape, the holes of each group are located next to one another on a generatrix and the signal from the light source 3 is received either in two holes located next to one another, one hole of the first group and no hole in the second group, one hole in the second group and no hole in the first group, or no holes on a generatrix, thereby forming any appropriate digital code, well known in the prior art. The photo elements 6a and 6b thereby either both receive a light signal, or the photo elements 6a and 6b receive only one light signal each, or neither photo element 6a or 6b receive a light signal. This again results in the formation of a digital word, which can be processed directly. In this embodiment, no electronic evaluation system is necessary, since the light signals directly represent a corresponding position of the inertial mass 2. The reference numerals of like parts of FIG. 3 are the same as those of FIG. 1.

FIG. 4 again shows the inertial mass 2 in an overhead view, in the center of which is the light source 3, and the holes 4a and 4b allow the photo elements 6a and 6b to receive a corresponding beam of light.

Figure 5:
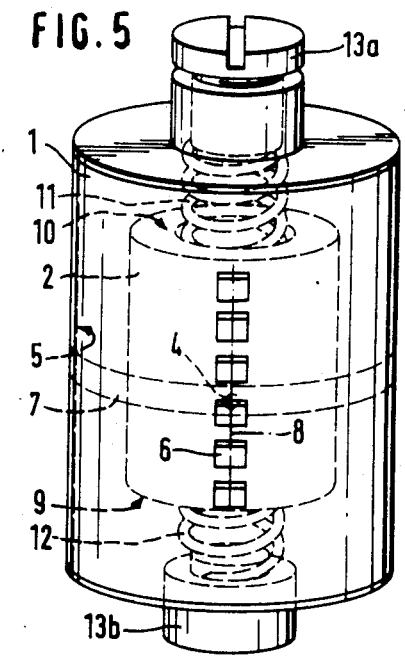
FIG. 5 shows schematically an accelerometer with one hole and several photo elements in cross section.

FIG. 5 shows a variant of an accelerometer, in which there is a single hole 4 in the mass 2, so that the light from the light source 3 located inside the inertial mass 2 can strike a different photo element 6 of the housing 1. The photo elements 6 are arranged at an interval one behind another in the direction of movement, and the position of the inertial mass 2 can be determined as a function of which photo element 6 is struck by the light source 3. The power feed to the light source 3 preferably travels via the springs 11 and 12, and the inertial mass 2 can be calibrated or adjusted by means of an adjusting screw 13. The reference numerals of like parts of FIG. 5 are the same as those of FIG. 1.

Figure 6:
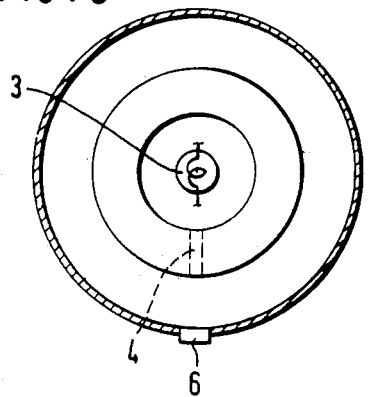
FIG. 6 shows schematically a cross section of the accelerometer illustrated in FIG. 5.

FIG. 6 shows the embodiment of FIG. 5 in an overhead view with the inertial mass 2, whereby the light from the light source 3 travels through the single hole 4 to the photo elements 6 arranged one adjacent or behind the other, and the position of the inertial mass 2 can thereby be determined.

Figure 4:
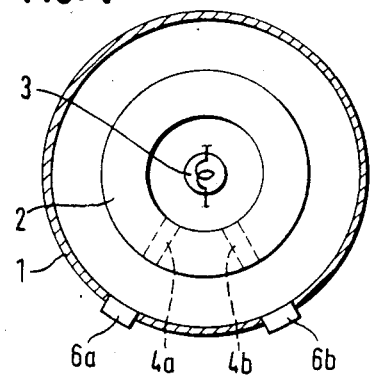
FIG. 4 shows schematically a cross section of the accelerometer illustrated in FIG. 3.
Figure 7:
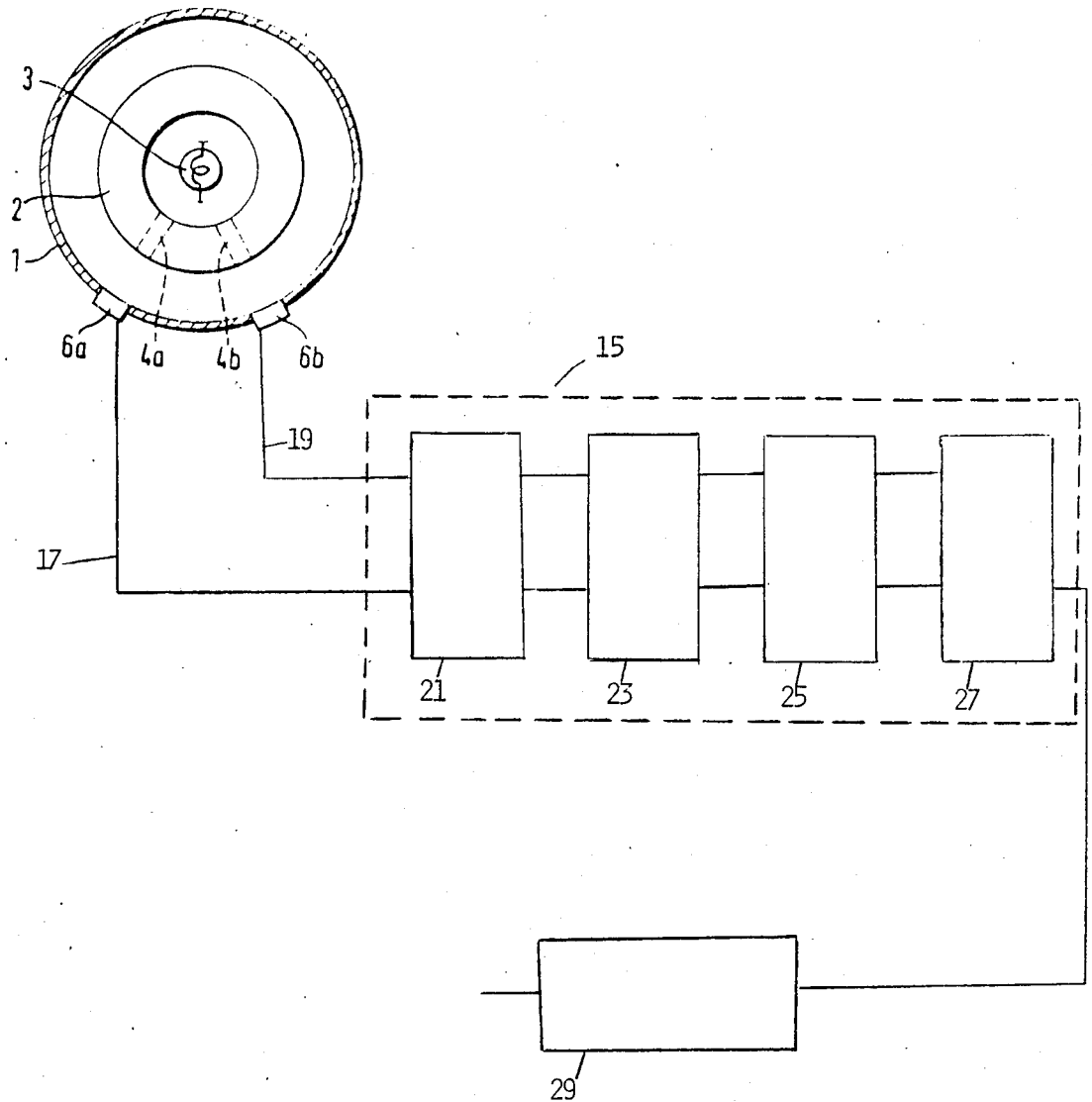
FIG. 7 shows schematically a cross section of the accelerometer illustrated in FIG. 4 with electronic circuitry attached thereto.

FIG. 7 shows FIG. 4 with a digital processor 15 connected by lead pairs 17 and 19 to the photo elements 6a and 6b, respectively, which digital processor 15 generates a displacement signal at an output 21. Some examples of digital processors are found in U.S. Pat. No. 4,563,734, entitled "Multivariable Proportional-Integral-Derivative Process Control Apparatus"; U.S. Pat. No. 4,558,430, entitled "Controller Of Digital Control System And Method For Controlling The Same"; and U.S. Pat. No. 4,471,451, entitled "Digital Data Sense Amplifier And Signal Differentiator", all of which are incorporated herein by reference as if set forth herein in their entirety. The digital processor 15 comprises a digital decoder 21, up and down counter circuits 23 for determining distance of displacement of the inertial mass 2 within the housing 1, difference circuits 25 for determining velocity of movement of the accelerometer, and second difference circuits 27, for determining acceleration. The outputs of circuits 23, 25 and 27 are connected to a mass spring system calculator 29 for converting these outputs to true acceleration and velocity of the housing 1.

Figure 8:
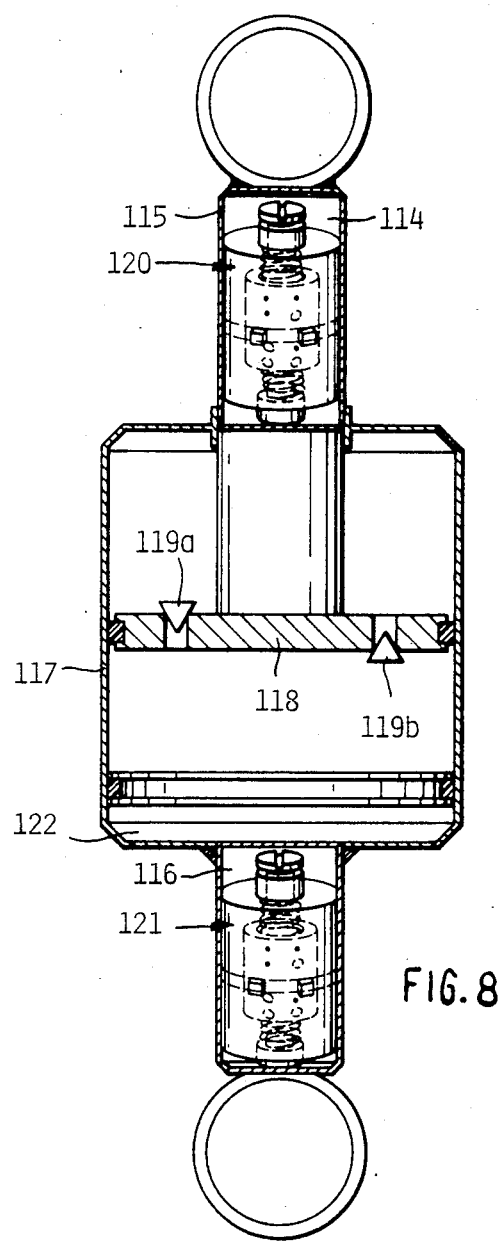
FIG. 8 shows schematically a vibration damper with integrated accelerometer.

FIG. 8 shows a vibration damper which comprises a cylinder 117, a piston rod 115 and a damping piston 118. The damping piston 118 has valves 119a and 119b for its operation. In a cavity 114 of the piston rod 115 there is an accelerometer 120, and in the floor of the cylinder 117, in a cavity 116, there is a second accelerometer 121. With this configuration, a measurement of the relative acceleration between suspended and non-suspended vehicle parts is possible. Moreover, depending on the circuit configuration, one of the accelerometers 120 or 121 can be used to perform a measurement either of the acceleration of the suspended or the non-suspended vehicle parts. Typically, the diameter of the piston rod 115 and the bottom of the vibration damper about the accelerometer 121 are in the range of about 11 mm to about 28 mm. Various preferred embodiments of accelerometers are illustrated individually in FIGS. 1 to 7. Circuits corresponding to those shown in FIG. 7 are typically connected to both the accelerometers 120 and 121 and the signals from circuits 21 through 29 are combined to provide relative acceleration, velocity and movement between the accelerometers and the components connected thereto.

The invention as described hereinabove in the context of the preferred embodiments is not to be taken as limited to all of the provided details thereof, since modifications and variations thereof may be made without departing from the spirit and scope of the invention.

What is claimed is:

1. A suspension system, of a type including hydraulic, pneumatic, and hydropneumatic suspension systems, for a motor vehicle having suspended and unsuspended vehicle components, said suspension system comprising:

at least one sensing unit disposed in one of said vehicle components;

said at least one sensing unit comprising at least one unit for sensing a predetermined parameter of said vehicle component;

said at least one sensing unit each comprising:

a housing for being disposed within said one vehicle component;

said housing having an inertial mass disposed to move substantially freely therein;

a source of light disposed within and moving freely with said inertial mass;

means for suspending said inertial mass for substantial free movement within said housing and for permitting said inertial mass to move back and forth within said housing during use when said predetermined parameter is being measured;

means for conducting light from said light source in an interior portion of said inertial mass to an exterior portion of said inertial mass; and said housing having photoelectric sensing means disposed therewithin to selectively receive light from said light source within said inertial mass through said light conducting means as said inertial mass moves back and forth within said housing.

2. The suspension system according to claim 1, wherein at least one of said suspended components comprises a portion of vibration damping means having said sensor disposed therewithin.

3. The suspension system according to claim 2, wherein said predetermined parameter is acceleration.

4. The suspension system according to claim 2, wherein said suspension means comprises electrically conductive and simultaneously mechanically elastic means for feeding electric power to said light source.

5. The suspension system according to claim 2, wherein said vibration damping means comprises a shock absorber having a piston rod, said piston rod having one of said at least one sensing units disposed therewithin.

6. The suspension system according to claim 5, wherein said shock absorber has a portion opposite said piston rod, said opposite portion having a second sensing unit of said at least one sensing unit disposed therewithin.

7. The suspension system according to claim 6, including acceleration circuitry connected to said digital decoding circuitry.

8. The suspension system according to claim 1, wherein said light conducting means comprises a sole light conductor and said photoelectric sensing means comprises a plurality of photoelectric elements, for generating digital signals, disposed at a given distance from one another along a direction of said back and forth movement of said mass.

9. The suspension system according to claim 8, wherein said suspension means comprises electrically conductive and simultaneously mechanically elastic means for feeding electric power to said light source.

10. The suspension system according to claim 8, wherein said light conducting means comprises a plurality of holes disposed in groups in said mass and said photoelectric means comprises a plurality of photoelectric elements disposed in groups and aligned to receive light from a corresponding one of said groups.

11. The suspension system according to claim 10, wherein said groups of holes are aligned in straight lines along the back and forth movement of said mass.

12. The suspension system according to claim 11, wherein there is one of said photoelectric elements for each group of said holes.

13. The suspension system according to claim 1, wherein said suspension means comprises springs connected to said mass and said housing for suspending said mass for movement within said housing.

14. The suspension system according to claim 1, including a digital decoding circuitry connected to said photoelectric sensing means to connect digital signals therefrom to signals related to the back and forth movement of said mass.

15. The suspension system according to claim 14, including acceleration circuitry connected to said digital decoding circuitry.

16. The suspension system according to claim 1, wherein said predetermined parameter is acceleration.

17. The suspension system according to claim 16, including acceleration circuitry connected to said digital decoding circuitry.

18. The suspension system according to claim 1, wherein said mass has an end surface at each end thereof and said suspension means comprises two springs making connection with said end surfaces and also making electrical connection with said light source for providing electric power thereto.

19. The suspension system according to claim 1, wherein said suspension means comprises electrically conductive and simultaneously mechanically elastic means for feeding electric power to said light source.

* * * * *